(12) United States Patent
Pohlen et al.

(10) Patent No.: US 12,411,277 B2
(45) Date of Patent: Sep. 9, 2025

(54) GLAZING WITH LIGHTING CAPABILITIES

(71) Applicant: ACR II GLASS AMERICA INC., Nashville, TN (US)

(72) Inventors: Markus Walter Pohlen, Grevenmacher (LU); Olivier Farreyrol, Grevenmacher (LU)

(73) Assignee: ACR II GLASS AMERICA INC., Nashville, TN (US)

( * ) Notice: Subject to any disclaimer, the term of this patent is extended or adjusted under 35 U.S.C. 154(b) by 0 days.

(21) Appl. No.: 18/716,784

(22) PCT Filed: Dec. 13, 2022

(86) PCT No.: PCT/US2022/081412
§ 371 (c)(1),
(2) Date: Jun. 5, 2024

(87) PCT Pub. No.: WO2023/114745
PCT Pub. Date: Jun. 22, 2023

(65) Prior Publication Data
US 2025/0044502 A1    Feb. 6, 2025

Related U.S. Application Data (60) Provisional application No. 63/289,382, filed on Dec. 14, 2021, provisional application No. 63/289,405, (Continued)

(51) Int. Cl.
*G02B 6/00* (2006.01)
*B32B 17/10* (2006.01)
(Continued)

(52) U.S. Cl.
CPC ...... *G02B 6/0095* (2013.01); *B32B 17/10036* (2013.01); *B32B 17/10513* (2013.01);
(Continued)

(58) Field of Classification Search
CPC ....................................................... B60Q 3/208
See application file for complete search history.

(56) References Cited

U.S. PATENT DOCUMENTS 10,830,405 B2 * 11/2020 Di Trapani ............ G02B 6/003
11,953,713 B2    4/2024 Pohlen
(Continued)

FOREIGN PATENT DOCUMENTS

WO    WO-2007077099 A1 *  7/2007   ............ B32B 17/10
WO       2020/188078 A1      9/2020

OTHER PUBLICATIONS

International Search Report entered in U.S. Appl. No. 22/081,412.
Written Opinion entered in U.S. Appl. No. 22/081,412.

*Primary Examiner* — Robert J May
(74) *Attorney, Agent, or Firm* — K&L Gates LLP (57) ABSTRACT

This disclosure relates to a glazing with a laminated structure for providing lighting capabilities that comprises a first glass sheet with a first surface and a second surface, a second glass sheet with a third surface and a fourth surface, an interlayer between the first glass sheet and the second glass sheet, and a lighting system, which may include a light source, a light guide attached to the first light source and at least partially laminated between the first glass sheet and the second glass sheet, and a light extraction zone having a light extraction means laminated between the first glass sheet and the second glass sheet.

39 Claims, 8 Drawing Sheets

Related U.S. Application Data filed on Dec. 14, 2021, provisional application No. 63/289,400, filed on Dec. 14, 2021, provisional application No. 63/289,374, filed on Dec. 14, 2021.

(51) Int. Cl.
| | | |
|---|---|---|
| *B60J 1/00* | (2006.01) | |
| *B60Q 3/208* | (2017.01) | |
| *B60Q 3/62* | (2017.01) | |
| *F21V 8/00* | (2006.01) | |

(52) U.S. Cl.
CPC ......... *B32B 17/10541* (2013.01); *B60J 1/001* (2013.01); *B60Q 3/208* (2017.02); *B60Q 3/62* (2017.02); *G02B 6/0076* (2013.01); *B32B 2605/08* (2013.01)

(56) References Cited

U.S. PATENT DOCUMENTS

| | | | |
|---|---|---|---|
| 2010/0124074 A1* | 5/2010 | Brychell | G02B 6/006 362/604 |
| 2015/0253486 A1 | 9/2015 | Verger et al. | |
| 2017/0139109 A1 | 5/2017 | Gierens et al. | |
| 2023/0391054 A1* | 12/2023 | Pohlen | B32B 17/10504 |

* cited by examiner

GLAZING WITH LIGHTING CAPABILITIES

PRIORITY CLAIM AND CROSS-REFERENCE TO RELATED APPLICATIONS

The present application is a National Stage of International Application No. PCT/US22/81412 filed on Dec. 13, 2022 which claims priority to and benefit of U.S. Provisional Patent App. No. 63/289,374 filed Dec. 14, 2021, titled GLAZING WITH LIGHTING CAPABILITIES, U.S. Provisional Patent App. No. 63/289,382 filed Dec. 14, 2021, titled GLAZING WITH LIGHTING CAPABILITIES, U.S. Provisional Patent App. No. 63/289,400 filed Dec. 14, 2021, titled GLAZING WITH LIGHTING CAPABILITIES, and U.S. Provisional Patent App. No. 63/289,405 filed Dec. 14, 2021, titled GLAZING WITH LIGHTING CAPABILITIES, the entire contents of each of which are incorporated by reference herein in their entirety and relied upon.

BACKGROUND

The present disclosure is generally related to a glazing with lighting capabilities. There are numerous reasons an automotive vehicle may need to supply light to the interior or the exterior of the vehicle. For example, a rear windshield may be equipped with a rear brake light that emits light to the exterior of the vehicle whenever the brakes of the vehicle are engaged. Alternatively, lighting may be provided to the interior cabin of a vehicle to supply reading light or ambient lighting. Current vehicle cabin lighting systems may focus on providing large, centrally located cabin lights or overhead passenger lights that do not supply the desired light that some passengers require. For example, cabin lights may provide a light that is too intense for some passengers. Additionally, physical design constraints in automotive vehicles mean having the flexibility to supply the required light to the interior or exterior through different space efficient and aesthetically pleasing means is attractive.

For each of the above reasons, it is desirable to provide an automotive glazing with lighting capabilities for providing ambient lighting for a vehicle.

SUMMARY

The laminated glazing disclosed herein improves on existing glazing by providing a glazing with an integrated lighting system for providing light of a desired intensity to a desired location along the glazing and throughout the cabin of the vehicle.

In light of the disclosure, and without limiting the scope of the invention in any way, in a first aspect of the present disclosure, which may be combined with any other aspect listed herein unless specified otherwise, a glazing comprises a laminated structure including a first glass sheet with a first surface and second surface, a second glass sheet with a third surface and fourth surface, an interlayer between the first glass sheet and the second glass sheet, and a lighting system. The lighting system includes at least one first light source and at least one first light guide attached to each first light source. The lighting system also includes at least one first light extraction zone for directing light into a second light guide within the laminated structure. The second light guide may include a second extraction zone, including a second light extraction means wherein light in the second light guide is extracted by the second light extraction means at the second light extraction zone.

In a second aspect of the present disclosure, which may be combined with any other aspect listed herein unless specified otherwise, the glazing is a sunroof.

In a third aspect of the present disclosure, which may be combined with any other aspect listed herein unless specified otherwise, the second light extraction means is on a surface of the first glass sheet or the second glass sheet.

In a fourth aspect of the present disclosure, which may be combined with any other aspect listed herein unless specified otherwise, the second light extraction means is on a film.

In a fifth aspect of the present disclosure, which may be combined with any other aspect listed herein unless specified otherwise, the film is laminated between a first glass sheet and a second glass sheet.

In a sixth aspect of the present disclosure, which may be combined with any other aspect listed herein unless specified otherwise, the film is applied to a surface of the first glass sheet or the second glass sheet.

In a seventh aspect of the present disclosure, which may be combined with any other aspect listed herein unless specified otherwise, the second extraction means includes a print In an eighth aspect of the present disclosure, which may be combined with any other aspect listed herein unless specified otherwise, the second extraction means is printed on a surface of the first glass sheet or the second glass sheet.

In a ninth aspect of the present disclosure, which may be combined with any other aspect listed herein unless specified otherwise, the second extraction means is printed on a surface of the interlayer.

In a tenth aspect of the present disclosure, which may be combined with any other aspect listed herein unless specified otherwise, the second light guide is the second glass sheet and the second glass sheet faces a vehicle interior when installed.

In an eleventh aspect of the present disclosure, which may be combined with any other aspect listed herein unless specified otherwise, the first light extraction means includes a luminescent composition.

In a twelfth aspect of the present disclosure, which may be combined with any other aspect listed herein unless specified otherwise, the first light source is a laser.

In a thirteenth aspect of the present disclosure, which may be combined with any other aspect listed herein unless specified otherwise, the first light guide at least partially or completely surrounds the laminated glazing.

In a fourteenth aspect of the present disclosure, which may be combined with any other aspect listed herein unless specified otherwise, the first light guide and the first light extraction zone are adhered to an edge of the laminated structure and an encapsulation material is applied around the laminated structure edge, over the first light guide and the first light extraction zone.

In a fifteenth aspect of the present disclosure, which may be combined with any other aspect listed herein unless specified otherwise, the first light guide may be at least partially laminated between the first glass sheet and the second glass sheet and the first light extraction zone may be laminated between the first glass sheet and the second glass sheet.

In a sixteenth aspect of the present disclosure, which may be combined with any other aspect listed herein unless specified otherwise, the light absorption coefficient in the second light guide is less than 0.1/cm.

In a seventeenth aspect of the present disclosure, which may be combined with any other aspect listed herein unless specified otherwise, the first light extraction zone has at least one area of a variable light intensity.

In a eighteenth aspect of the present disclosure, which may be combined with any other aspect listed herein unless specified otherwise, there are three first light guides and three corresponding light sources and first light extraction zones.

In a nineteenth aspect of the present disclosure, which may be combined with any other aspect listed herein unless specified otherwise, the three first light extraction zones are three separate colors: red, green, and blue.

In a twentieth aspect of the present disclosure, which may be combined with any other aspect listed herein unless specified otherwise, multiple first light extraction zones each include a different light extraction means.

In a twenty-first aspect of the present disclosure, which may be combined with any other aspect listed herein unless specified otherwise, the laminated structure includes a switchable layer.

In a twenty-second aspect of the present disclosure, which may be combined with any other aspect listed herein unless specified otherwise, the laminated structure of the glazing further includes an infrared reflective layer.

In a twenty-third aspect of the present disclosure, which may be combined with any other aspect listed herein unless specified otherwise, the infrared reflective layer is a coating provided on the first glass sheet.

In a twenty-fourth aspect of the present disclosure, which may be combined with any other aspect listed herein unless specified otherwise, the infrared reflective layer is provided as a film laminated between the first glass sheet and the switchable layer.

In a twenty-fifth aspect of the present disclosure, which may be combined with any other aspect listed herein unless specified otherwise, the laminated structure of the glazing further includes a low-emissivity coating on the second glass sheet.

In a twenty-sixth aspect of the present disclosure, which may be combined with any other aspect listed herein unless specified otherwise, the first interlayer is darkened in color.

In a twenty-seventh aspect of the present disclosure, which may be combined with any other aspect listed herein unless specified otherwise, a glazing comprises a first glass sheet with a first surface and second surface and a lighting system. The lighting system includes at least one first light source and at least one first light guide attached to each first light source and at least partially or completely surrounding the first glass sheet. The lighting system also includes at least one first light extraction zone for directing light into a second light guide within the laminated structure. The second light guide may include a second extraction zone, including a second light extraction means wherein light in the second light guide is extracted by the second light extraction means at the second light extraction zone.

Additional features and advantages are described in, and will be apparent from, the following Detailed Description and the Figures. The features and advantages described herein are not all-inclusive and, in particular, many additional features and advantages will be apparent to one of ordinary skill in the art in view of the figures and description. Also, any particular embodiment does not have to have all of the advantages listed herein and it is expressly contemplated to claim individual advantageous embodiments separately. Moreover, it should be noted that the language used in the specification has been selected principally for readability and instructional purposes, and not to limit the scope of the inventive subject matter.

BRIEF DESCRIPTION OF THE FIGURES

The accompanying drawings, which are incorporated into and constitute a part of this specification, illustrate one or more example aspects of the present disclosure and, together with the detailed description, serve to explain their principles and implementations.

DETAILED DESCRIPTION

In the following description, for purposes of explanation, specific details are set forth in order to promote a thorough understanding of one or more aspects of the disclosure. It may be evident in some or all instances, however, that any aspects described below can be practiced without adopting the specific design details described below.

Among other features, the present disclosure provides an automotive glazing having lighting capabilities. Particularly, the automotive glazing may provide ambient lighting to a vehicle interior. Such ambient lighting may preferably be found above a passenger compartment of the vehicle, such as in a sunroof. The ambient lighting may provide an aesthetic function within the vehicle. In some embodiments, the laminated glazing described herein may be used in other automotive glazings, such as side windows or partitions.

Figure 1:
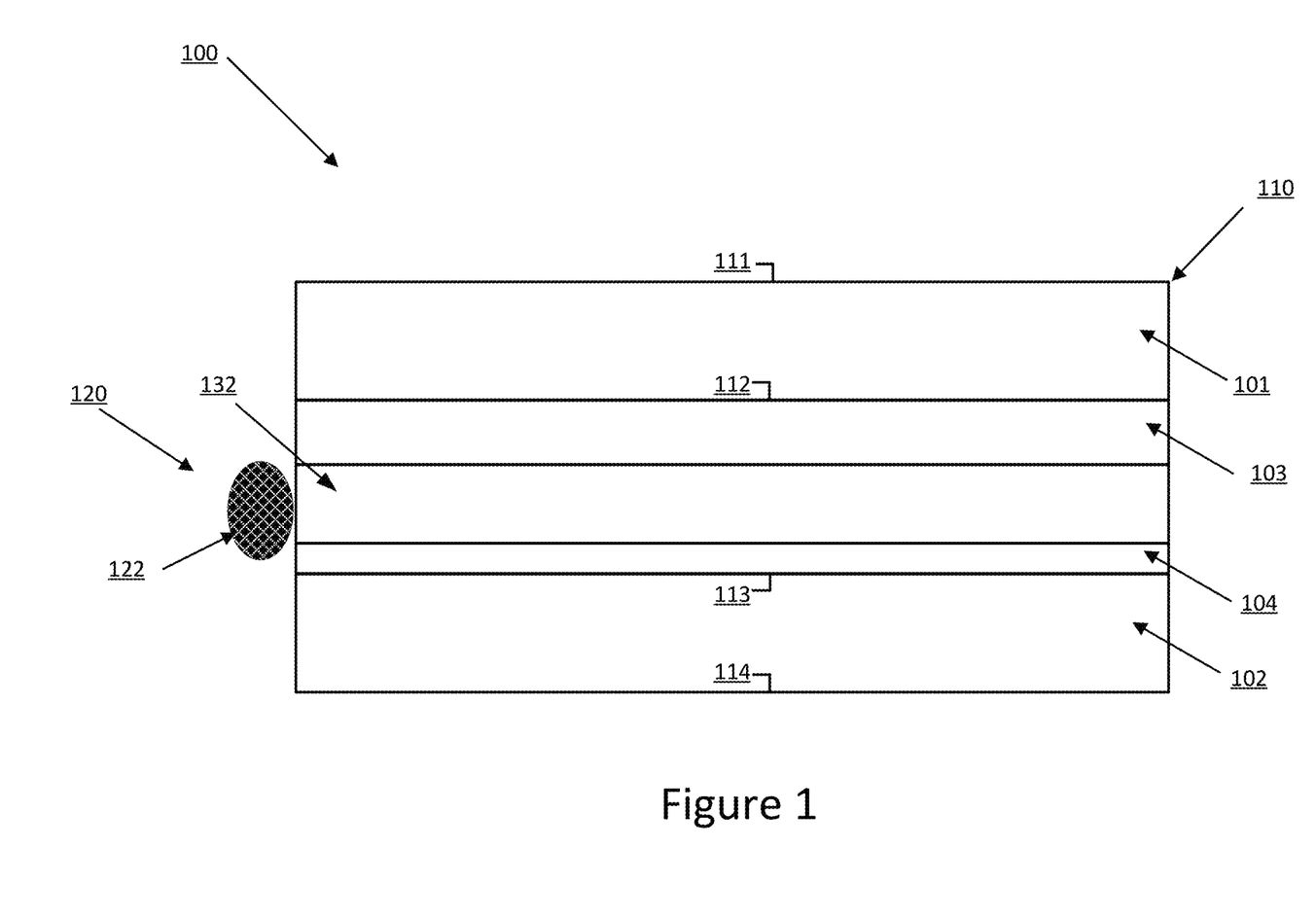
FIG. 1 illustrates a cross section of a glazing according to an exemplary embodiment of the present disclosure.

FIG. 1 illustrates a cross section of a glazing according to an exemplary embodiment of the present disclosure. The glazing 100 has a laminated structure 110, including a first glass sheet 101 with a first surface 111 and second surface 112, a second glass sheet 102 with a third surface 113 and fourth surface 114. For example, the glazing 100 may be designed for use as a sunroof of a vehicle, where the first surface 111 of the first glass sheet 101 faces, such that it is exposed to, the exterior of the vehicle, the fourth surface 114 of the second glass sheet 102 faces the interior of the vehicle, and both the second surface 112 and third surface 113 face an interlayer 103, 104. The first and second glass sheets 101, 102 may preferably be from 0.5 mm to 3 mm, more preferably from 1 mm to 2.5 mm. The glass sheets 101, 102 may include, without limitation, soda-lime silicate glass described by ISO 16293-1:2008. The laminated structure 110 of the glazing 100 may include an interlayer, which may contain one or more layers, such as a first interlayer 103 and a second interlayer 104. The interlayer is laminated between the second surface 112 of the first glass sheet 101 and the third surface 113 of the second glass sheet 102. The interlayer 103, 104 may include an adhesive polymer film, such as a polyvinyl butyral, or an ionomer. The laminated structure 110 may have at least four sides. The glazing may also include a lighting system 120 that features a first light guide 122 and a second light guide 132, for example for providing a cabin light in a vehicle.

Figure 2:
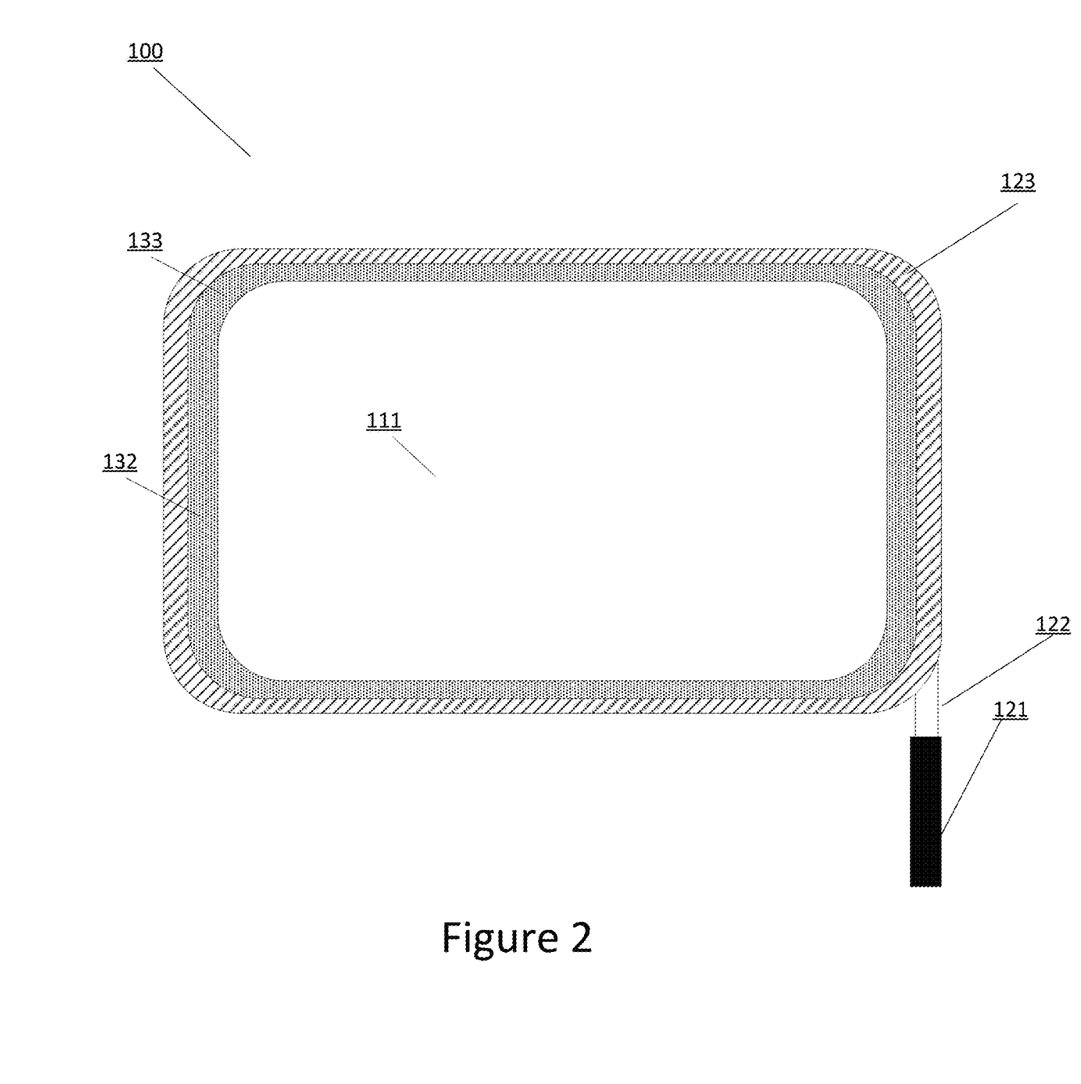
FIG. 2 illustrates a lighting system of a laminated glazing according to an exemplary embodiment of the present disclosure.

FIG. 2 illustrates an example of a lighting system of an embodiment of the present disclosure. A laminated glazing 100 according to an exemplary embodiment of the present disclosure may include a lighting system 120. A lighting system 120 for providing a light via a laminated glazing 100 may include a first light source 121 attached to a first light guide 122 and containing a first light extraction zone 123. The first light source 121 may be detachable from the first light guide 122. The first light source 121 may couple to the first light guide 122, for example, by a fiber optic connector or optical fiber coupler. The first light source 121 may preferably include a laser light source.

The light from the light source 121 may be directed to a first light guide 122. The light may reflect within the first light guide 122 with total internal reflection before reaching a light extraction zone 123. The first light guide 122 may have an index of refraction higher than that of the surrounding materials. The first light guide 122 may be thin and may be flexible so as to wrap around an edge of the laminated structure 110, as shown in FIG. 2. The light guide 122 may, for example, include a glass or polymer based optical fiber having a thickness of 0.1 to 1.5 mm.

The first light guide 122 may have a first light extraction zone 123 where light is emitted from the first light guide 122 into the laminated structure 110 of the glazing 100. In some embodiments, the first light extraction zone 123 may preferably surround or partially surround the laminated structure 110 so as to introduce light around the edge of the laminated structure 110 of the glazing 100, as shown in FIG. 2. For example, the first extraction zone 123 could substantially surround the laminated structure 110 of a windshield in order to provide light along the edges of the laminated structure 110 in order to provide an aesthetically pleasing ambient light to the cabin of a vehicle. In some embodiments, the first light extraction zone 123 may extend over only part of the glazing 100 edge. For example, the first light extraction zone 123 may extend along fewer than all of the glass edges using one or more first light guides 122. The light extraction zone 123 may also be provided in multiple separated portions of the light guide 122 such that there may be portions of the light guide 122 extending between sections including the light extraction zone 123. The first light guide 122 and the first light extraction zone 123 may be positioned around the edge of the laminated structure 110 and adhered to the structure 110. A resin adhesive may be preferable in some embodiments.

The light emitted from the first light extraction zone 123 may be extracted from a portion of the first light guide 122. Particularly, where the first light guide 122 is a round fiber, the first light extraction means may not extend around the entire fiber. Further, if the first light guide is positioned in a design which includes twists or turns, the positioning of the first light extraction zone 123 may be determined to compensate for the shape of the first light guide 122. The light guide 122 may be provided around or near an edge of laminated glass sheets 101,102 or may be provided in any desired area of the glazing, such as in a design towards a middle of the glazing.

The first light extraction zone 123 may include a first light extraction means, which may include an area of a fiber first light guide 122 having an extraction composition, such as a luminescent composition which may include luminescent particles or other luminescent material, thereon. A luminescent composition may include appropriate luminescent materials to extract the light in a desired visible wavelength. For example, the light may be extracted as white colored visible light. The intensity of the light may depend on the power supplied to the light source 121 in the lighting system 120. The power supplied to the light source 121 may be controlled by an electrically controlled driver unit. A user may be able to adjust the intensity of the light with a dimming switch.

The light may be extracted at the first light extraction zone 123 into a second light guide 132. The second light guide 132 may include a glass sheet or another layer of the laminated structure 110. For example, in some embodiments, the second light guide 132 may be a film laminated within the laminated structure (for example, as shown in FIG. 1). A second light guide 132 implemented as a layer of the laminated structure 110 preferably is clear or substantially clear in color to prevent loss of light by absorption through the second light guide 132 which would otherwise occur during reflection of the light through the second light guide 132.

On a pathlength x through the light guide, the light intensity may decay according to $I(x)=I_0 \exp(-\alpha x)$ with light absorption coefficient $\alpha$. Preferably the light absorption coefficient is less than 0.1/cm through the second light guide 132, more preferably less than 0.05/cm. The light may enter the second light guide 132 at an angle suitable for total internal reflection so that the light may reflect through the second light guide 132 to a second light extraction zone 133 having a second light extraction means. The second light guide 132 may be surrounded by materials having an index of refraction lower than the second light guide 132.

The second light guide 132 may include a second light extraction zone 133 which may include a second light extraction means for providing an ambient light to a vehicle interior. The second light extraction zone 133 may be designed and positioned to complement a design of the first light guide 122 and first light extraction zone 123 in some embodiments. The second light extraction means may be diffusive, reflective, or combinations thereof. A diffusive second light extraction means may be preferable. Where a pattern in the ambient light provided is desired, the second light extraction means may be varied across the second light extraction zone 133 to provide such a pattern. For example, a concentration of diffusive and/or reflective materials may be varied across the second light extraction zone 133. It may be preferable to provide a symmetrical dispersion of light across the glazing 100. A variation in the second light extraction zone 133 may also be used to provide an even appearance across a glazing 100. Light may dull moving away from the first light extraction zone 123. If an even light dispersion is desired across a glazing 100, the second light extraction means may be varied to provide less diffusion near the first light extraction zone 133 and more diffusion away from the first light extraction zone 133. Such variation may be achieved, for example, by a change in the density of diffusive particles across the second light extraction zone 133 or by using a combination of different materials.

A second light extraction means may include a coating or printed material, such as a non-opaque enamel or a fine particle containing coating, or a diffusive material embedded in the second light guide 132. The fine particles may have an index of refraction higher or lower than the second light guide 132. The second light extraction means may, in some further embodiments, include roughening of a glass surface, which may include treating the glass surface with a laser. Light extracted by the second light extraction means may preferably be a diffused light for providing a desired ambient light to a vehicle interior. For example, the second light extraction means may be positioned on the glazing 100, including on a layer of the laminated structure 110 glazing 100 so as to provide diffused light to a vehicle interior. The second light extraction means may be provided on the surface of the second light guide 132, such as a glass surface, an interlayer surface, or a film surface, and may be positioned within the laminated structure 110 or on an outer surface of the laminated structure 110. The second light extraction means may be provided as a coating, a paint, or a film, for example, and may be provided over a part of the glazing, as shown in FIG. 2, or an entire glazing surface. For example, where the second light extraction means is provided over part of the glazing 100, the second light extraction means may provide a pattern across the glazing. Additionally, a second light extraction means may be positioned on a film, which may include a laminated film or a film, on the third surface 113 of the second glass surface 102, for example, facing a vehicle interior when the glazing is installed.

Figure 3:
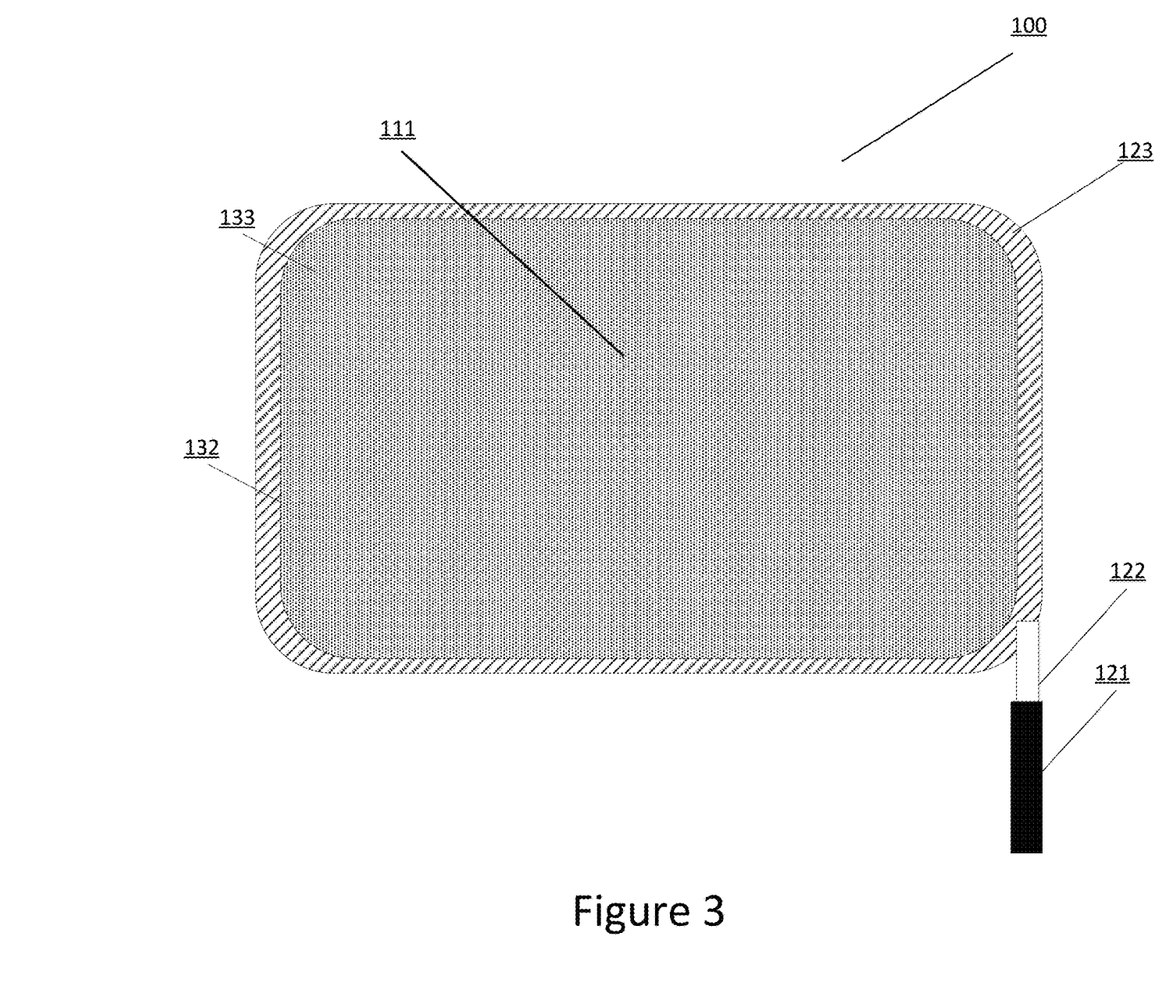
FIG. 3 illustrates a lighting system of a laminated glazing according to an exemplary embodiment of the present disclosure.

FIG. 3 illustrates another example of a lighting system of an embodiment of the present disclosure. A lighting system 120 of an embodiment of the present disclosure may include a second light guide 132 implemented as a glass sheet or film laminated between the first and second glass sheets 101, 102. In some further embodiments, the second light guide 132 may be a layer of the laminated glazing 100, such as the second glass sheet 102. The second light extraction zone 133 which includes a second light extraction means may be attached to the second light guide 132. The second light extraction means may be provided as a coating or a film provided over the entire glazing surface, as shown in FIG. 3.

The positioning of the first light extraction zone 123 may cause local increases or decreases in light intensity where the first light extraction zone 123 turns at a corner or in a design. This may occur where portions of the first light extraction zone 123 are close to each other and relatively more light is being distributed than in areas without such proximity or where a positive corner causes a relative decrease in light intensity. Intensity correction may be achieved with adjustments to the first light extraction means. The first light extraction means may affect the local intensity of the light provided via the lighting system. The first light extraction zone 123 and first light extraction means may, for example, be adjusted at a corner of the laminated structure for reducing light intensity towards a corner. The change in intensity may preferably be gradual towards and away from a corner of the laminated structure with a corner having relatively lowest light intensity. Without such changes to the light, there may be an uneven brightness of the light to an observer as the sides of light would come together closely in the corners. Thus, the fading light towards a corner may compensate for this so that the light from each side of a corner may combine when close to the corner and an observer may see a more even light distribution around the glazing. The light output from the first light extraction zone 123 may be locally increased where there is a positive corner which otherwise would provide a space of relatively dimmer light. The first light extraction means (and light intensity) may be adjusted, for example, by altering the local concentration of luminescent material in the first light extraction means. The light intensity may also be altered as necessary for evening of light distribution where the first light extraction zone is provided in a decorative pattern or in other areas that would otherwise provide an uneven light output. In some embodiments, it may be desired to create a lighting design of changing light distribution with such a variation in light output from the first light extraction zone 123.

Figure 4:
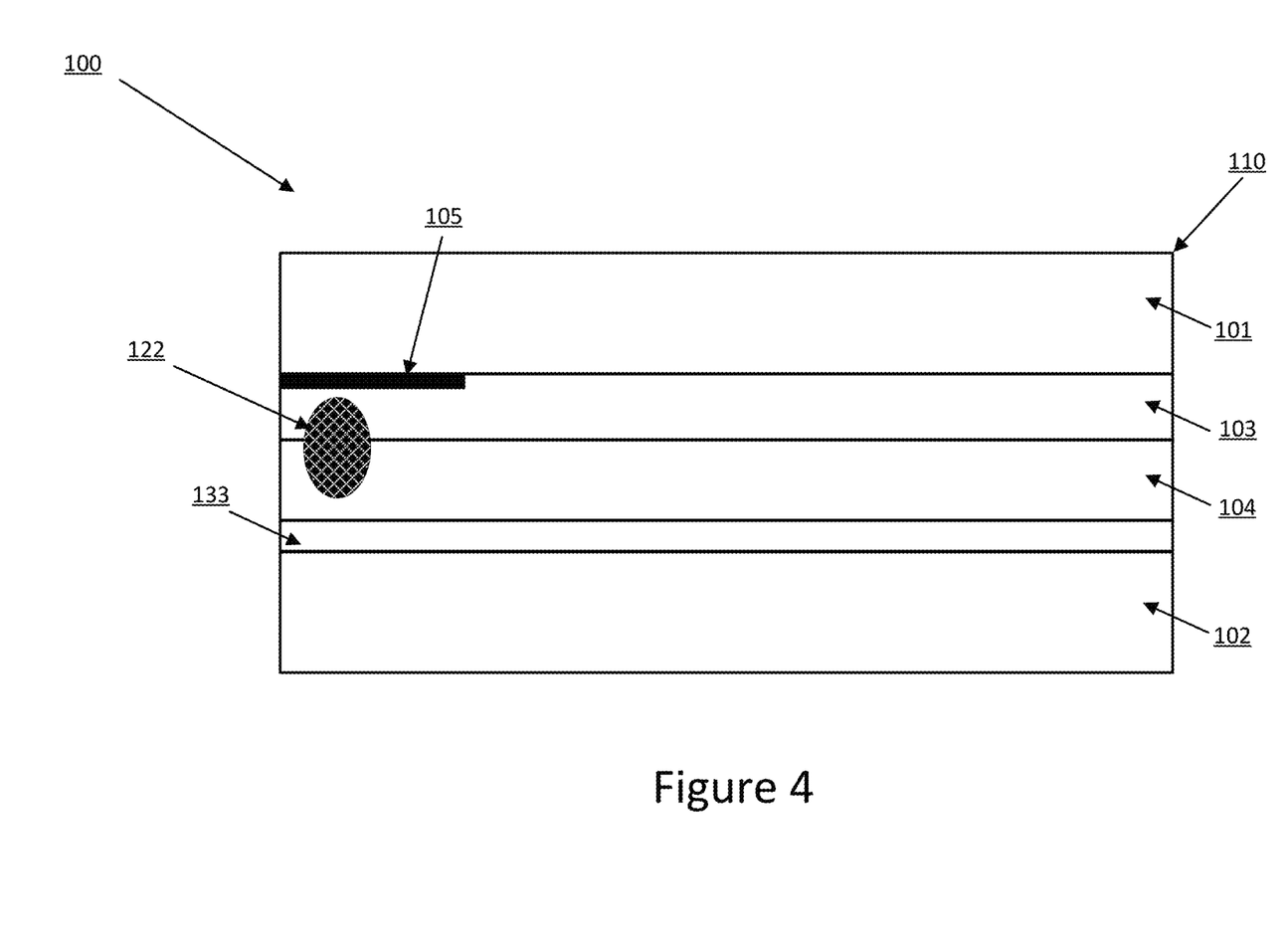
FIG. 4 illustrates a cross section of a laminated glazing according to an exemplary embodiment of the present disclosure that includes a first light guide that is at least partially laminated between two layers of an interlayer.

FIG. 4 illustrates a cross section of an example embodiment of a glazing of the present disclosure. A lighting system 120 for providing lighting capabilities to a laminated glazing may be substantially laminated within the laminated structure 110. For example, at least a portion of the first light guide 122 and the first light extraction zone 123 may be laminated between the first glass sheet 101 and the second glass sheet 102. In some embodiments, the laminated first light guide 122 and first extraction zone 123 may be laminated between two interlayer layers 103, 104. Where at least some of the lighting system 120 is laminated between the first and second glass sheets 101, 102, the first light source 121 may be detachable such that it can be attached to the first light guide 122 after lamination. The first light guide 122 may extend out of the interlayers 103, 104 and the glazing 100 for attachment to a first light source 121. In some embodiments, the first or second glass sheet 101,102 may include a recess or an opening through which an optical fiber first light guide 122 may pass. The first light guide 122 and first light extraction zone 123 may be in any desired shape. The first light guide 122 may be a material, including an optical fiber, which may be flexible to follow a shape of the glazing 100 or provide another design in the glazing 100.

The first light extraction zone 123 may be positioned along an area of the laminated structure having an opaque masking layer 105. The opaque masking layer 105 may include an opaque print around the periphery of the laminated structure 110. Such an opaque print may be an enamel print, which may be black, and may be provided on a surface of the first glass sheet 101 and/or the second glass sheet 102. The opaque masking layer 105 may block a view of the first light extraction zone 123. In some embodiments, the opaque masking layer 105 may include additional blocking materials, such as a metallic layer, to prevent or limit visibility of the first light extraction zone. The second light extraction zone 133 may include the second light extraction means.

Figure 5:
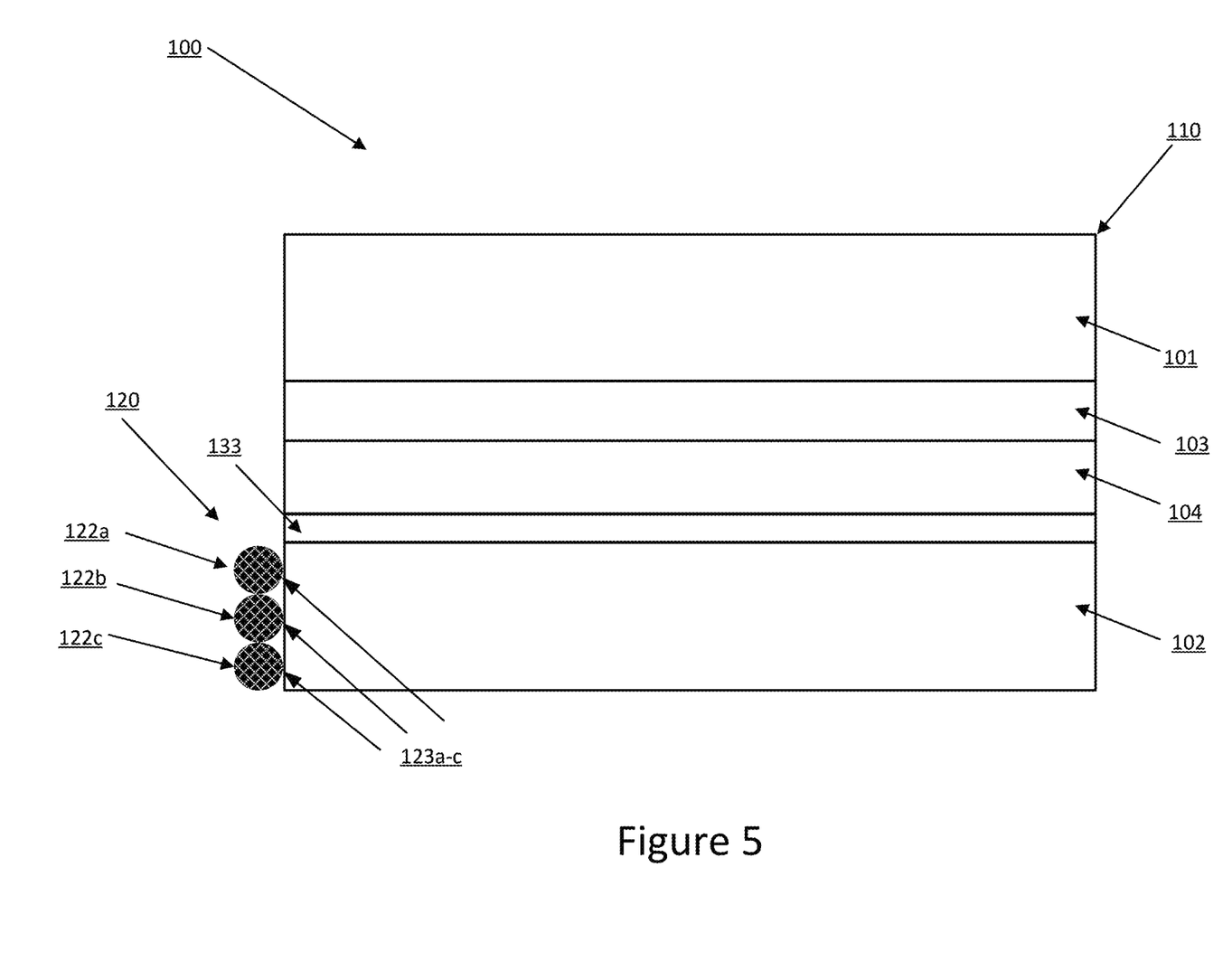
FIG. 5 illustrates a cross section of a laminated glazing according to an exemplary embodiment of the present disclosure that includes multiple first light guides and multiple first light extraction zones.

FIG. 5 illustrates a cross section of an example embodiment of a glazing of the present disclosure. A lighting system 120 for providing lighting capabilities to a glazing 100 having a laminated structure 110 may include multiple light sources, first light guides 122, and first light extraction zones 123. For example, the multiple first light sources 121*a-c* may be provide different colors of light. The multiple first light extraction zones 123*a-c* may have different compositions to provide multiple color options to a user. Particularly, the first light extraction zones 123*a-c* may emit red, green, and blue light, respectively. The first light sources 121*a-c* may be connected to a control mechanism for controlling the color output, including relative light intensity, to provide a desired appearance. The red, green, and blue light may be directed from the first light extraction zones 123*a-c* to the second light guide 132 (second glass sheet 102 in FIG. 5) where the light may be internally reflected until reaching a second light extraction zone 133 which includes the second light extraction means. The light may be extracted to a vehicle interior at the second light extraction zone 133. The multiple first light guides 122*a-c* and first light extraction zones 123*a-c* may be aligned with each other and positioned together within the construction. It may be preferable to provide the multiple first light guides 122*a-c* in a stacked formation to allow the light extraction from each of the first light extraction zones 123*a-c*. In some embodiments, the first light guides 122 may be twisted together and the corresponding first light extraction zones may be positioned to account for the twisting. The multiple light sources may be contained in separate housings or may be all positioned within one housing. Where the first light guides 122*a-c* and first light extraction zones 123*a-c* are positioned around the edge of a laminated structure 110, the second glass sheet 102 may have a thickness suitable for placement of the three first light guides and first extraction zones, as shown in FIG. 5. The laminated structure 110 of the glazing 100 having such a lighting system 120 may preferably include clear or light colored layers between a vehicle interior and the second light extraction zone 133 to provide a suitable appearance of the light emitted for ambient lighting. Some embodiments may include the use of tinted glass, interlayers, coatings, or films outside of the second light extraction zone 133. Some embodiments may further include a solar control layer within the interlayer and outside of the second light guide 132 and second light extraction zone 133. A solar control layer may include, for example, an infrared reflective layer or layers, which may be provided as a coating on a glass surface or film.

Figure 6:
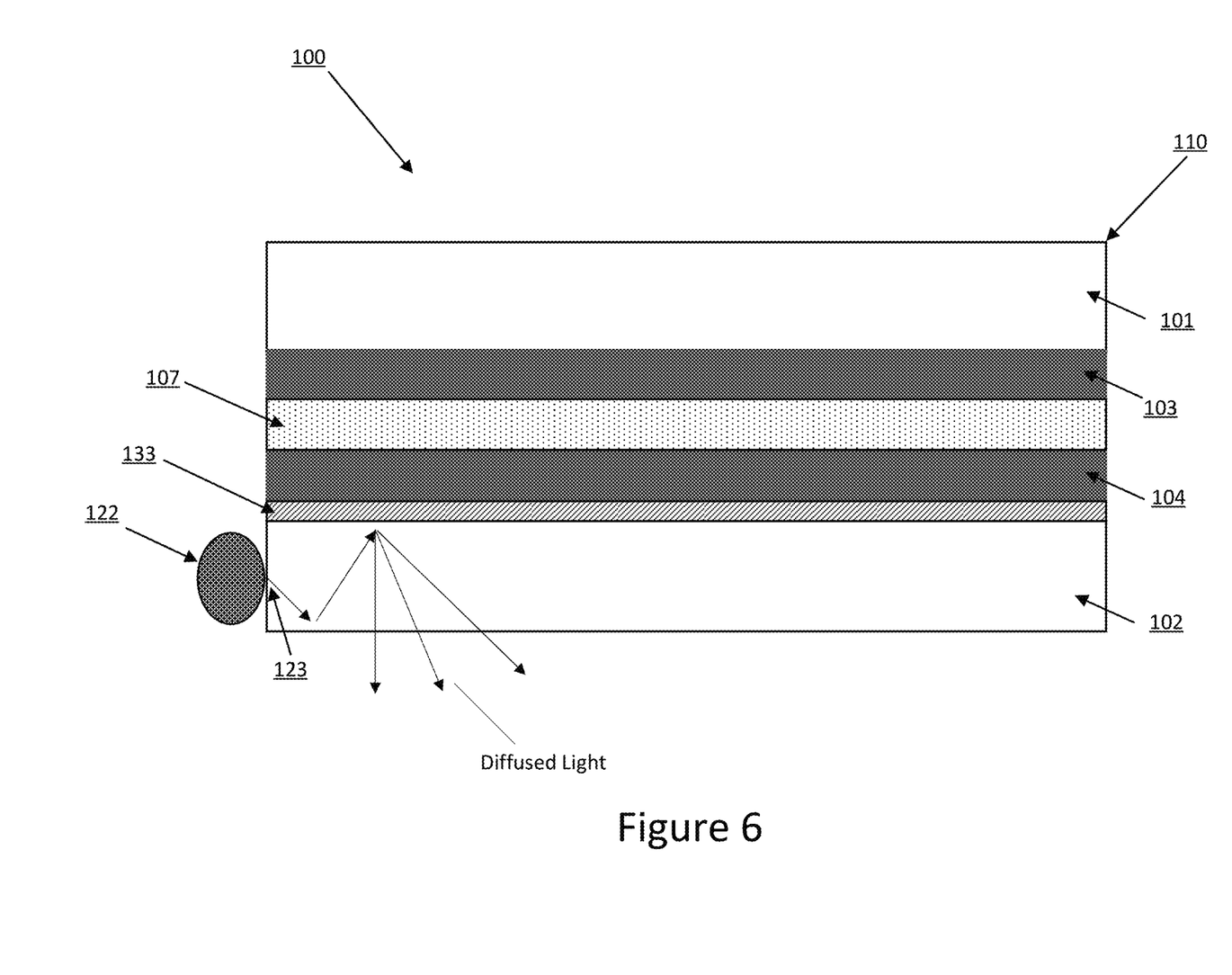
FIG. 6 illustrates a cross section of a laminated glazing according to an exemplary embodiment of the present disclosure.

FIG. 6 illustrates a cross section of another example embodiment of a laminated glazing of the present disclosure. The laminated structure 110 of a glazing 100 of the present disclosure may further include a switchable layer 107. A switchable layer 107 may include an electrically controllable layered material which may change in opacity based on an electrical signal. The switchable material may include a film laminated between first and second glass sheets 101, 102. Switchable films may include a liquid crystal film, which may include substrate layers each having an electrode thereon sandwiching a liquid crystal core layer. The switchable film may be laminated between interlayers 103, 104 between first and second glass sheets 101, 102. The interlayers 103, 104 may be adhesive layers and may be the same or different in thickness and composition. The first light extraction zone 123 may emit light to a second light guide 132 that is between the switchable layer and the vehicle interior when installed in a vehicle, particularly between the switchable layer and an outer surface (e.g. the fourth surface 114 of the second glass sheet 102), as shown in FIG. 6.

In other example embodiments, the second glass sheet 102 and/or the second interlayer 104 may serve as the second light guide 132. In some embodiments, a second light guide 132 may include a film laminated between the switchable layer 107 and the second glass sheet 102. The second glass sheet 102 may preferably be clear in color so as to not limit the light emitted by the lighting system. The second light extraction zone 133 includes a second light extraction means, which may be provided on a surface of the second glass sheet 102, as shown in FIG. 6, a surface of the second interlayer, or a surface of the switchable layer. In some embodiments, the second light extraction means may include diffusing particles embedded within a layer in the glazing. As in other example embodiments, the second light extraction means may cover all or part of the glazing 100. In some embodiments, it may be preferable to include a darkened layer to the exterior of the switchable layer 107. For example, the first glass sheet 101 or the first interlayer 103 may be darkened in color, which may include a green or grey color.

Figure 7:
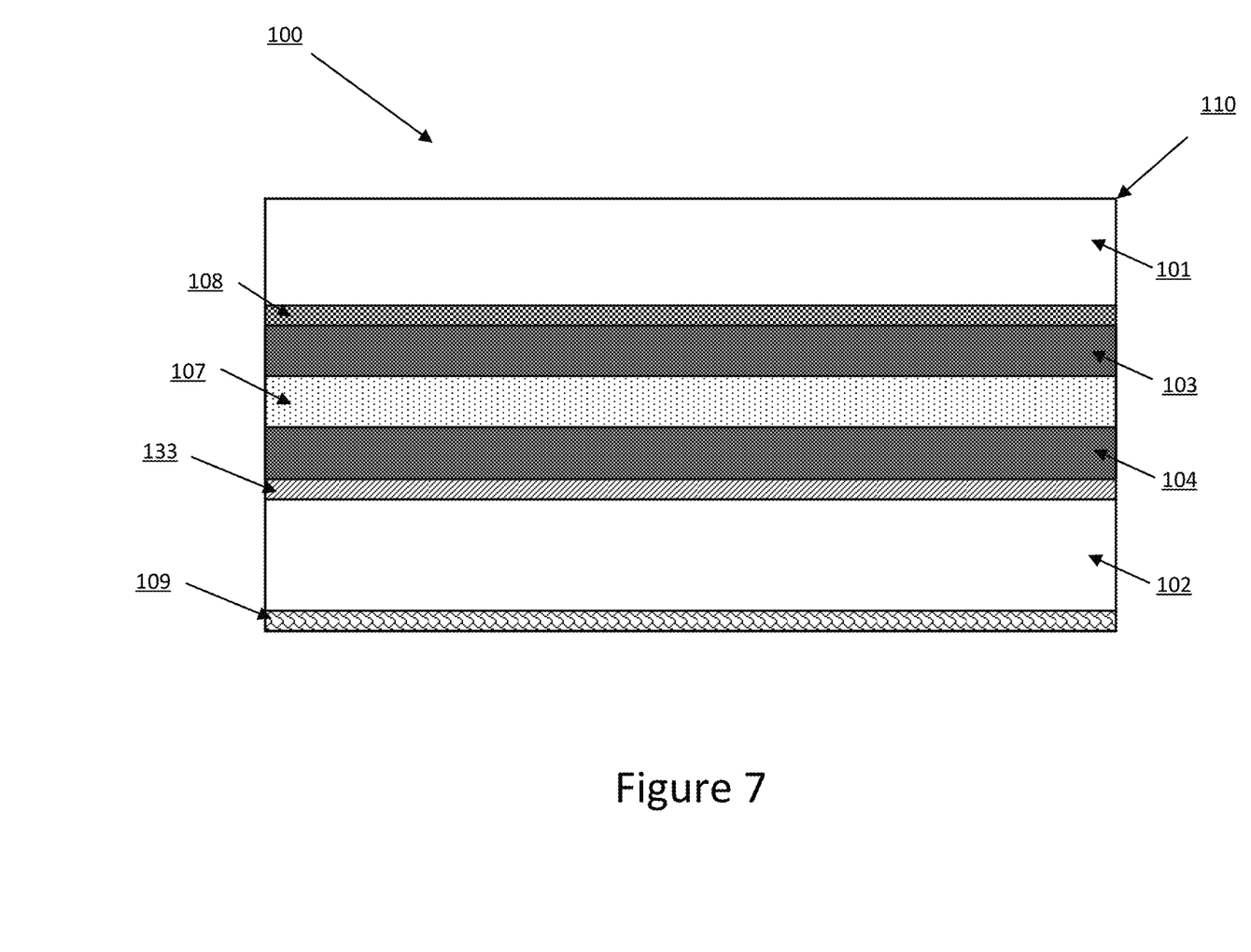
FIG. 7 illustrates a cross section of a laminated glazing according to an exemplary embodiment of the present disclosure including an infrared reflective layer and low emissivity coating.

FIG. 7 illustrates a cross section of another example embodiment of a laminated glazing of the present disclosure that includes a switchable layer 107. A laminated glazing 100 having a switchable layer 107 may include a darkened layer, which may include a glass sheet 101 or an interlayer 103,104 on either side of the switchable layer 107. Where an interlayer 104 between a switchable layer 107 and a vehicle interior is darkened, an additional interlayer may be provided between the darkened interlayer 104 and the second glass sheet 102 to prevent loss of light when reflected within the second light guide 132 (which may be the second glass sheet 102). The laminated structure 110 of a glazing 100 may include a solar control layer. A solar control layer may include, for example, an infrared reflective layer 108 or layers, which may be provided as a coating on a glass surface or film. Where an infrared reflective layer 108 is included, the first glass sheet may preferably be clear in color. The infrared reflective layer 108 may be included to improve the overall thermal comfort of a vehicle by limiting the infrared light reaching a vehicle interior. Such a layer is preferably provided to an exterior of the switchable layer 107 where there is a switchable layer 107 and may also protect the switchable layer 107 from infrared light. The infrared reflective coating 108 may preferably be provided on a surface of the first glass sheet 101 and an infrared reflective film may be laminated between interlayers 103, 104, between the first glass sheet 101 and the switchable layer 107. To provide a dark color to the laminated glazing 100 having an infrared reflective layer 108, an interlayer to the interior of the infrared reflective layer 108 may preferably be darkened in color so that the infrared light reflected is not absorbed by the darkened layer. The glazing 100 may include a low-emissivity (low-e) coating 109 on a second glass sheet 102 for further improving the thermal comfort of a vehicle interior. When the switchable layer 107 is in a relatively transparent state, the glazing 100 may have a total visible light transmission of 5% to 15% and total light transmission less than 25%.

A glazing 100 without a switchable layer 107 may also include an infrared reflective coating 108 or a low-e coating 109. Where a glazing includes a low-e coating 109, it may be preferable that the second light extraction means is provided on a surface of the second glass sheet 102 opposite the low-e coating 109 (i.e., the third glass surface 113). Where the second glass sheet 102 having the low-e coating 109 is also the second light guide 132, the low-e coating 109 may have a neutral color reflection of light at the reflection angle within the second light guide 132. If the color reflection is not neutral, a shift in the light color may occur.

Figure 8:
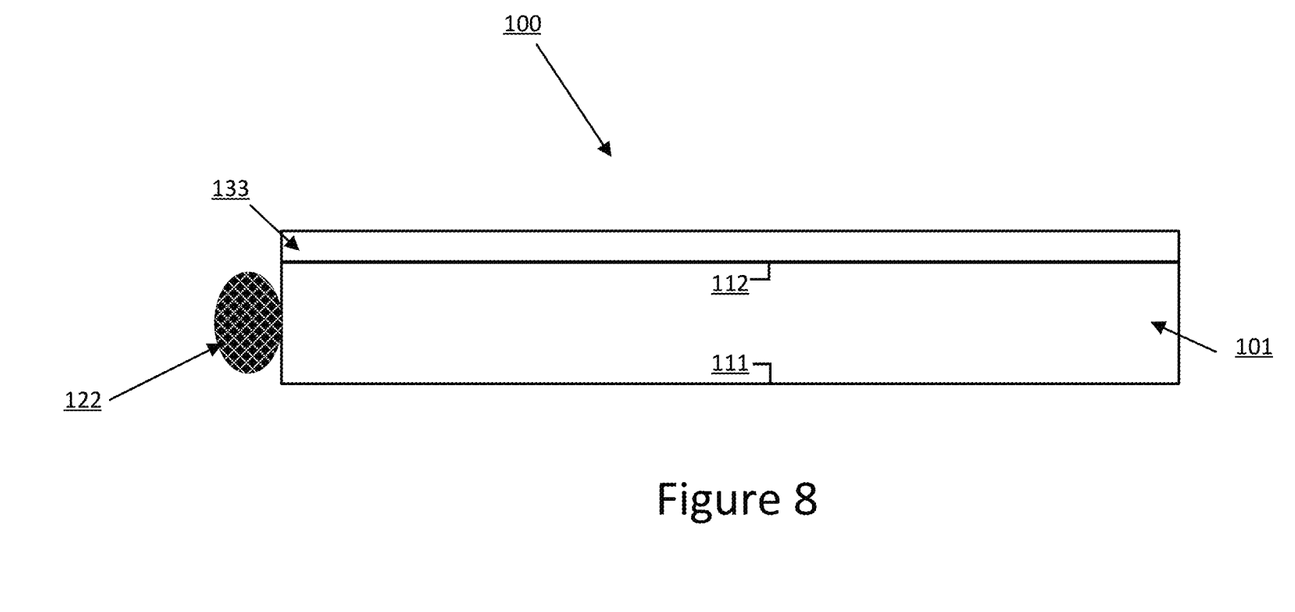
FIG. 8 illustrates a cross section of a laminated glazing according to an exemplary embodiment of the present disclosure that includes a single glass sheet.

FIG. 8 illustrates a cross section of another example embodiment of a laminated glazing of the present disclosure. In some embodiments, the glazing 100 may include a first glass sheet 101, with a first surface 111 and a second surface 1112, and not a second glass sheet. For example, first light guide 122 may be configured to direct light to a second light guide 132, which may be implemented as a glass sheet 101, in order to supply ambient lighting to a passenger window of a vehicle.

To provide a suitable surface for installation in a vehicle and to protect the lighting mechanism, the glazing may be encapsulated. The encapsulation material may be positioned around the glazing edge, over the lighting system, including the first light guide 122 and the first light extraction zone 123.

The above description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Further, the above description in connection with the drawings describes examples and does not represent the only examples that may be implemented or that are within the scope of the claims.

Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

The invention is claimed as follows:

1. A glazing, comprising:
   a laminated structure including:
      a first glass sheet;
      a second glass sheet; and
      an interlayer between the first glass sheet and the second glass sheet; and
   a lighting system including:
      three first light guides;
      three first light sources, each corresponding to one of the three first light guides and attached to each corresponding first light guide;
      three first light extraction zones, wherein each first light extraction zone includes a first light extraction means for directing light into a second light guide within the laminated structure; and
      a second light extraction zone including a second light extraction means wherein light in the second light guide is extracted at the second light extraction zone.

2. The glazing according to claim 1, wherein the glazing is a sunroof.

3. The glazing according to claim 1, wherein the second light extraction means is on a surface of the first glass sheet or the second glass sheet.

4. The glazing according to claim 1, wherein the second light extraction means is on a film.

5. The glazing according to claim 4, wherein the film is laminated between a first glass sheet and a second glass sheet.

6. The glazing according to claim 4, wherein the film is applied to a surface of the first glass sheet or the second glass sheet.

7. The glazing according to claim 1, wherein the second light extraction means includes a print.

8. The glazing according to claim 7, wherein the second light extraction means is printed on a surface of the first glass sheet or the second glass sheet.

9. The glazing according to claim 7, wherein the second light extraction means is printed on a surface of the interlayer.

10. The glazing according to claim 1, wherein the second light guide is the second glass sheet and the second glass sheet faces a vehicle interior when installed.

11. The glazing according to claim 1, wherein the first light extraction means includes a luminescent composition.

12. The glazing according to claim 1, wherein the at least one first light source is a laser.

13. The glazing according to claim 1, wherein the at least one first light guide at least partially or completely surrounds the laminated glazing.

14. The glazing according to claim 13, wherein the at least one first light guide and the at least one first light extraction zone are adhered to an edge of the laminated structure and an encapsulation material is applied around an edge of the laminated structure, over the at least one first light guide and the at least one first light extraction zone.

15. The glazing according to claim 1, wherein the at least one first light guide is at least partially laminated between the first glass sheet and the second glass sheet and wherein the at least one first light extraction zone is laminated between the first glass sheet and the second glass sheet.

16. The glazing according to claim 1, wherein a light absorption coefficient in the second light guide is less than 0.1/cm.

17. The glazing according to claim 1, wherein the at least one first light extraction zone has at least one area of a variable light intensity.

18. The glazing according to claim 1, wherein light from the three first light extraction zones are three separate colors: red, green, and blue.

19. The glazing according to claim 1, wherein multiple first light extraction zones each include a different light extraction means.

20. The glazing according to claim 1, wherein the laminated structure further comprises a switchable layer.

21. The glazing according to claim 1, further comprising an infrared reflective layer.

22. The glazing according to claim 21, wherein the infrared reflective layer is a coating provided on the first glass sheet.

23. The glazing according to claim 21, wherein the laminated structure further comprises a switchable layer, and wherein the infrared reflective layer is provided as a film laminated between the first glass sheet and the switchable layer.

24. The glazing according to claim 1, further comprising a low-emissivity coating on the second glass sheet.

25. The glazing according to claim 1, wherein the first interlayer is darkened in color.

26. A glazing having lighting capabilities, comprising:
   a glass sheet; and
   three first light guides at least surrounding the glass sheet;
   three first light sources, each corresponding to one of the three first light guides and attached to each corresponding first light guide;
   three first light extraction zones, wherein each first light extraction zone includes a first light extraction means for directing light into a second light guide within the laminated structure; and
   a second light extraction zone including a second light extraction means wherein light in the second light guide is extracted at the second light extraction zone.

27. The glazing according to claim 26, wherein the at least one first light guide completely surrounds the glass sheet.

28. The glazing according to claim 26, wherein the glazing is a sunroof.

29. The glazing according to claim 26, wherein the second light extraction means is on a surface of the glass sheet.

30. The glazing according to claim 26, wherein the second light extraction means is on a film applied to a surface of the glass sheet.

31. The glazing according to claim 26, wherein the second light extraction means includes a print.

32. The glazing according to claim 26, wherein the first light extraction means includes a luminescent composition.

33. The glazing according to claim 26, wherein the at least one first light source is a laser.

34. The glazing according to claim 26, wherein the at least one first light guide and the at least one first light extraction zone are adhered to an edge of the glass sheet and an encapsulation material is applied around a glass sheet edge, over the at least one first light guide and the at least one first light extraction zone.

35. The glazing according to claim 26, wherein a light absorption coefficient in the second light guide is less than 0.1/cm.

36. The glazing according to claim 26, wherein the at least one first light extraction zone has at least one area of a variable light intensity.

37. The glazing according to claim 26, wherein light from the three first light extraction zones are three separate colors: red, green, and blue.

38. The glazing according to claim 26, wherein multiple first light extraction zones each include a different light extraction means.

39. The glazing according to claim 26, further comprising a low-emissivity coating on the second glass sheet.

* * * * *